(12) United States Patent
Ezrielev et al.

(10) Patent No.: US 12,216,563 B2
(45) Date of Patent: Feb. 4, 2025

(54) SHARDED DATABASE LOAD DISTRIBUTOR

(71) Applicant: Dell Products, L.P., Round Rock, TX (US)

(72) Inventors: Ofir Ezrielev, Be'er Sheva (IL); Nadav Azaria, Be'er Sheva (IL); Yonit Weiss, Lehavim (IL)

(73) Assignee: DELL PRODUCTS L.P., Round Rock, TX (US)

( * ) Notice: Subject to any disclaimer, the term of this patent is extended or adjusted under 35 U.S.C. 154(b) by 664 days.

(21) Appl. No.: 17/508,571

(22) Filed: Oct. 22, 2021

(65) Prior Publication Data

US 2023/0128877 A1  Apr. 27, 2023

(51) Int. Cl.
| | | |
|---|---|---|
| G06F 9/50 | (2006.01) | |
| G06F 11/34 | (2006.01) | |
| G06F 16/25 | (2019.01) | |
| G06F 16/28 | (2019.01) | |
| G06F 18/214 | (2023.01) | |
| G06N 20/00 | (2019.01) | |

(52) U.S. Cl.
CPC ...... G06F 11/3433 (2013.01); G06F 11/3419 (2013.01); G06F 16/256 (2019.01); G06F 16/285 (2019.01); G06F 18/214 (2023.01); G06N 20/00 (2019.01)

(58) Field of Classification Search
CPC ....... G06F 9/505; G06F 9/5083; G06F 9/5088
See application file for complete search history.

(56) References Cited

U.S. PATENT DOCUMENTS 11,504,632 B1 * 11/2022 Schuster ............... G06F 16/182
2020/0242104 A1   7/2020 Persson

| | | |
|---|---|---|
| 2021/0089504 A1 | 3/2021 | Liu et al. |
| 2021/0303633 A1 | 9/2021 | Irazabal |
| 2021/0344749 A1 | 11/2021 | Karlsson et al. |
| 2022/0309045 A1 | 9/2022 | Lambert et al. |
| 2022/0414100 A1 | 12/2022 | Carter et al. |
| 2023/0009909 A1 | 1/2023 | Porter et al. |
| 2023/0019637 A1 | 1/2023 | Sadoghi Hamedani et al. |
| 2023/0124867 A1 | 4/2023 | Han |
| 2023/0131029 A1 | 4/2023 | Ezrielev et al. |

OTHER PUBLICATIONS

Office Action mailed Jun. 13, 2023 for U.S. Appl. No. 17/508,529, 17 pages.
Notice of Allowance mailed Oct. 5, 2023 for U.S. Appl. No. 17/508,529, 20 pages.

* cited by examiner

*Primary Examiner* — Andy Ho

(74) *Attorney, Agent, or Firm* — Amin, Turocy & Watson, LLP

(57) ABSTRACT

A system can divide a database into a group of shards that are distributed among a group of data centers. The system can train a machine learning model on a group of labeled input data, wherein the group of labeled input data comprises respective requests to operate on the database, and wherein the respective requests are labeled with respective shards of the group of shards used to process the respective requests, and to produce a trained machine learning model. The system can, after training the machine learning model, receive a request. The system can process the request with the trained machine learning model to predict that a data center of the group of data centers will have a largest number of leader shards of the group of shards to process the request. The system can send the request to the first data center to be processed.

20 Claims, 10 Drawing Sheets

800

802

TRAINING, BY A SYSTEM COMPRISING A PROCESSOR, A MACHINE LEARNING MODEL BASED ON A GROUP OF INPUT DATA, THE GROUP OF INPUT DATA COMPRISING RESPECTIVE REQUESTS TO OPERATE ON A DATA STORE THAT ARE LABELED WITH RESPECTIVE SHARDS OF A GROUP OF SHARDS THAT ARE DISTRIBUTED AMONG A GROUP OF DATA CENTERS, WHEREIN THE RESPECTIVE SHARDS ARE USED TO PROCESS THE RESPECTIVE REQUESTS, AND TO PRODUCE A TRAINED MACHINE LEARNING MODEL

PROCESSING A REQUEST WITH THE TRAINED MACHINE LEARNING MODEL TO PREDICT THAT A DATA CENTER OF THE GROUP OF DATA CENTERS IS THRESHOLD LIKELY TO HAVE A LARGEST NUMBER OF SHARDS OF THE GROUP OF SHARDS TO PROCESS THE REQUEST 806

SENDING THE REQUEST TO THE DATA CENTER 808

810

| DIVIDING A DATA STORE INTO A GROUP OF SHARDS THAT ARE DISTRIBUTED AMONG A GROUP OF DATA CENTERS 904 |

↓

| TRAINING A MACHINE LEARNING MODEL ON A GROUP OF INPUT DATA, WHEREIN THE GROUP OF INPUT DATA COMPRISES RESPECTIVE REQUESTS TO OPERATE ON THE DATA STORE THAT ARE LABELED WITH RESPECTIVE SHARDS OF THE GROUP OF SHARDS USED TO PROCESS THE RESPECTIVE REQUESTS, AND TO PRODUCE A TRAINED MACHINE LEARNING MODEL 906 |

↓

| STORING THE TRAINED MACHINE LEARNING MODEL 908 |

SHARDED DATABASE LOAD DISTRIBUTOR

BACKGROUND

A database can be spread across multiple computers by dividing a database into shards. Shards can be stored across multiple physical datacenters.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can divide a database into a group of shards that are distributed among a group of data centers. The system can train a machine learning model on a group of labeled input data, wherein the group of labeled input data comprises respective requests to operate on the database, and wherein the respective requests are labeled with respective shards of the group of shards used to process the respective requests, and to produce a trained machine learning model. The system can, after training the machine learning model, receive a request. The system can process the request with the trained machine learning model to predict that a data center of the group of data centers will have a largest number of leader shards of the group of shards to process the request. The system can send the request to the data center to be processed.

A method can comprise training, by a system comprising a processor, a machine learning model based on a group of input data, the group of input data comprising respective requests to operate on a data store that are labeled with respective shards of a group of shards that are distributed among a group of data centers, wherein the respective shards are used to process the respective requests, and to produce a trained machine learning model. The method can further comprise processing, by the system, a request with the trained machine learning model to predict that a data center of the group of data centers is threshold likely to have a largest number of shards of the group of shards to process the request. The method can further comprise sending, by the system, the request to the data center.

An example non-transitory computer-readable medium can comprise instructions that, in response to execution, cause a system comprising a processor to perform operations. These operations can comprise dividing a database into a group of shards that are distributed among a group of data centers. These operations can further comprise training a machine learning model on a group of input data, the group of labeled input data comprising respective requests to operate on the database, and that are labeled with respective shards of the group of shards used to process the respective requests, and to produce a trained machine learning model. These operations can further comprise storing the trained machine learning model.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 8 illustrates another example process flow a sharded database load distributor, in accordance with an embodiment of this disclosure;

FIG. 9 illustrates another example process flow a sharded database load distributor, in accordance with an embodiment of this disclosure;

DETAILED DESCRIPTION

Overview

Figure 1:
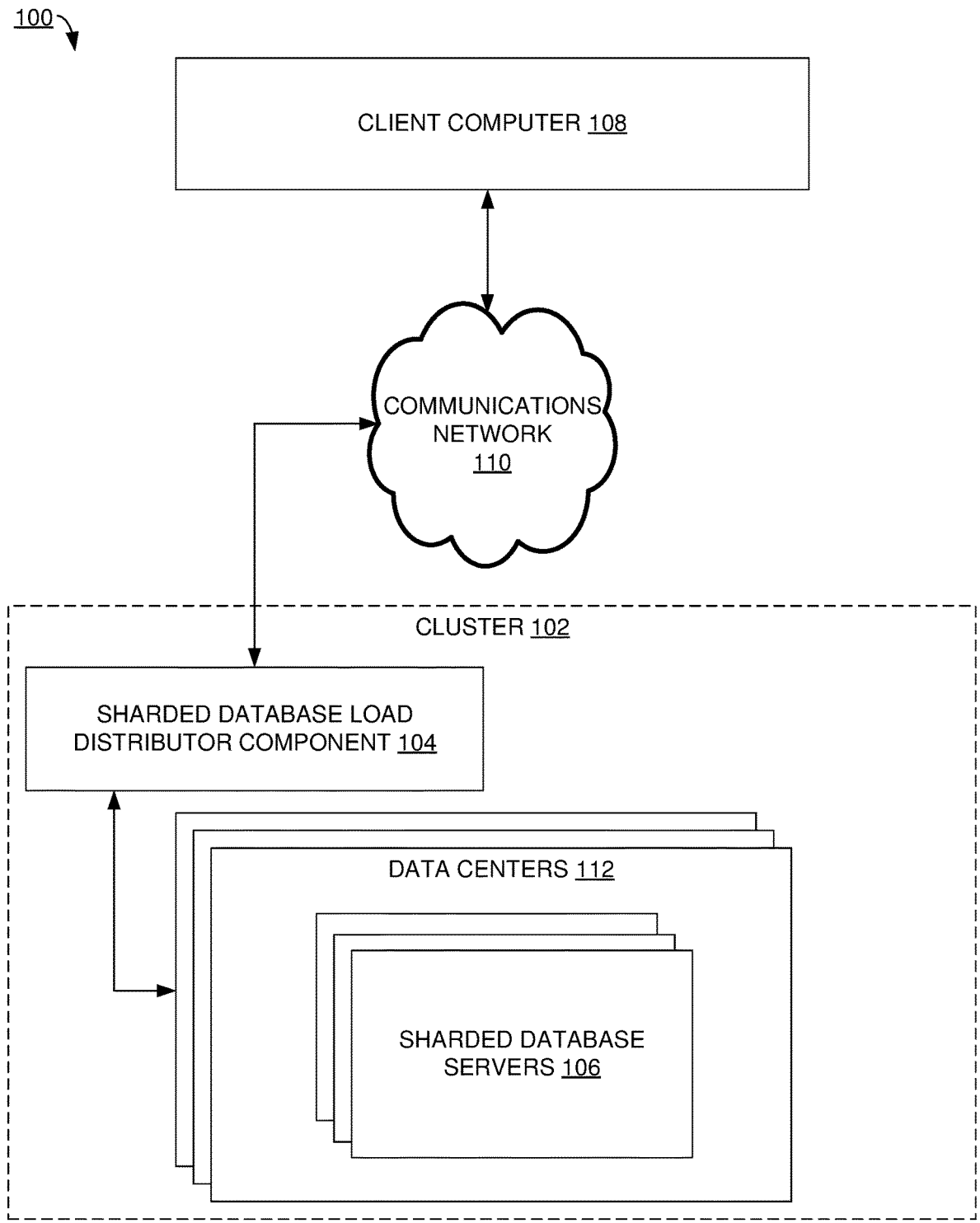
FIG. 1 illustrates an example system architecture that can facilitate a sharded database load distributor, in accordance with an embodiment of this disclosure.

In some examples, applications can be deployed on multiple datacenters that are located in multiple zones. It can be that a latency of transmitting data between datacenters can be greater than a latency of transmitting data within a datacenter. An approach to minimize latency can be to implement geolocation awareness, where application services attempt to communicate within the datacenter in which they reside. It can be challenging to implement geolocation awareness, because some services can require that all communications with a service travel through a single endpoint.

Forcing all communications with a service travel through a single endpoint can cause inter-datacenter communication, which can induce increased latency and security risks relative to intra-datacenter communication.

The present techniques can be implemented to mitigate against a problem of inter-datacenter communications by providing a load distributor (which can be distinguished from a load balancer), which can send requests to a database first to datacenters that are predicted to require the least inter-datacenter communications in the course of processing the request.

Sharding can comprise an approach of splitting and storing a single logical dataset into multiple databases, which can then be distributed among multiple computers. By distributing the data among multiple computers, a cluster of database systems can store larger datasets and handle additional requests compared to one database system. Sharding can be implemented where a dataset is too large to stored within a single database. Moreover, sharding strategies can facilitate additional computers being added over time. Sharding can facilitate scaling a database cluster along with its data and traffic growth.

There can exist various approaches to distribute data into multiple databases. Various approaches can have pros and cons based on assumptions made in an approach. For example, cross-partition operations can involve searching through many databases, and generally be inefficient to process. Hotspots can comprise an uneven distribution of data and operations, and can generally counteract benefits associated with sharding.

In some examples, a system can store multiple copies of one shard on different computers of the system. Where there are multiple copies of a shard, one copy can be designated as the leader replica, which processes all writes for the shard (and the writes can then be replicated out to the non-leader copies of the shard).

The present techniques can be applied to reduce an amount of inter-database communication involved with operating a program in a distributed cloud setting. This reduction of inter-database communication can translate to a lower latency in applications running in a distributed cloud.

The present techniques can also be implemented to dynamically distribute leader replicas to minimize inter-datacenter communications in processing a request.

The present techniques can be implemented to provide the following benefits. The present techniques can be implemented to decrease latency in program runs. Resource spending and latency bottlenecks encountered in program runs can be decreased, by reducing a number of inter-datacenter communications.

The present techniques can be implemented to improve system security. Inter-datacenter communications can provide a larger attack surface than intra-datacenter communications. By shifting communications from inter-datacenter to intra-datacenter, security can be improved.

The present techniques can be implemented to provide a dynamic system for leader replicas and requests distribution. That is, access correlation-based leader replicas and load distribution can be provided.

Example Architectures

FIG. 1 illustrates an example system architecture 100 that can facilitate a sharded database load distributor, in accordance with an embodiment of this disclosure. System architecture 100 comprises cluster 102, client computer 108, and communications network 110. In turn, cluster 102 comprises sharded database load distributor component 104, and data centers 112 (which in turn can each comprise an instance of sharded database servers 106).

Figure 10:
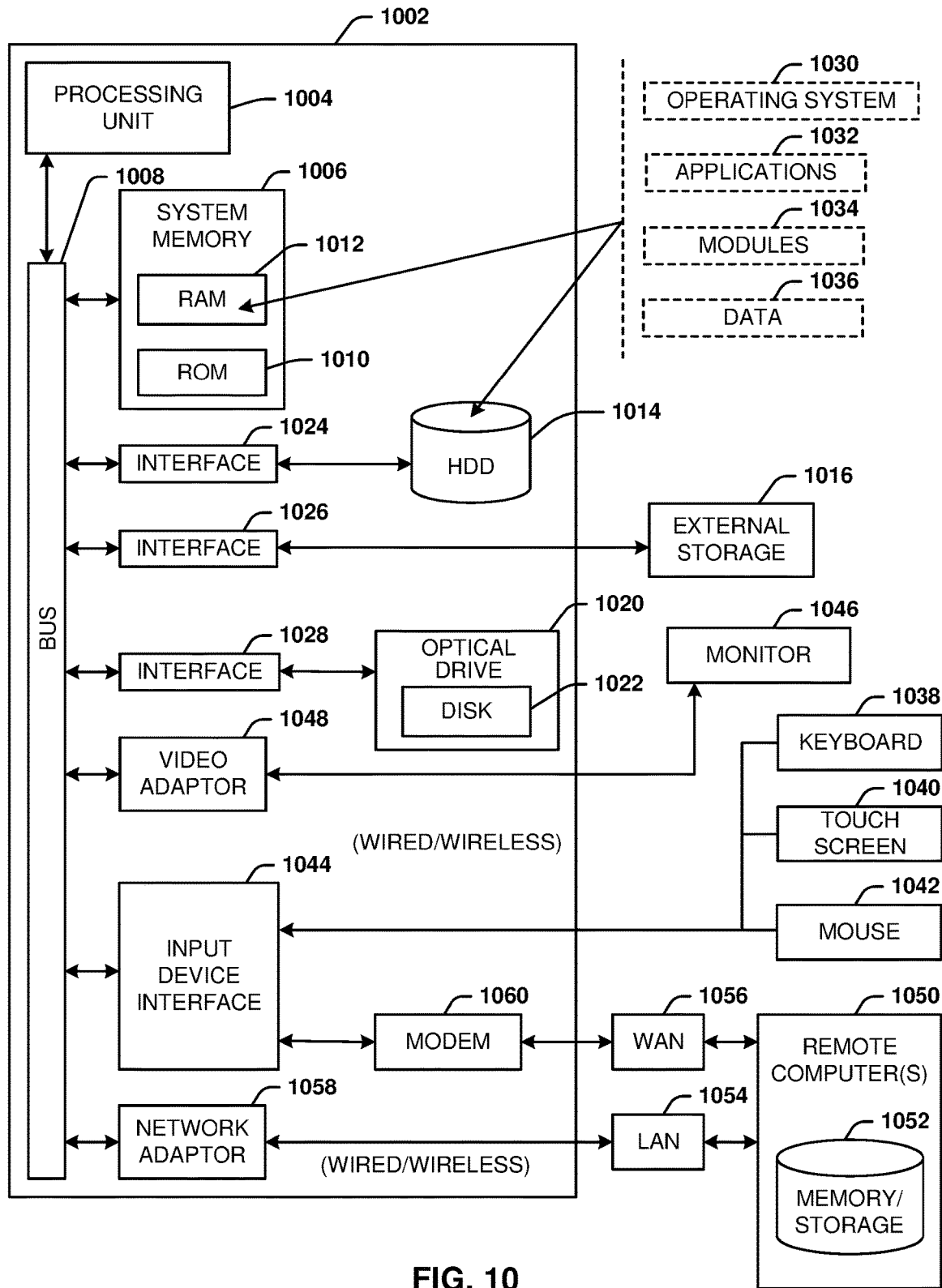
FIG. 10 illustrates an example block diagram of a computer operable to execute an embodiment of this disclosure.

Each of client computer 108, data centers 112, and sharded database servers can be implemented with part(s) of computing environment 1000 of FIG. 10. Communications network 110 can comprise a computer communications network, such as the Internet.

Cluster 102 can maintain a database where sharded database servers of sharded database servers 106 can store database shards. In some examples, different leader replicas of different shards are stored in different data centers of data centers 112 (and on different sharded database servers of sharded database servers 106).

Client computer 108 can make a request to access a sharded database stored on cluster 102. In the course of processing the request, multiple shard leaders can be accessed, some of which are can be in the same data center and some of which can be located in different data centers. Communications between sharded database servers within one data center can be referred to as "intra-data center communications," and communications between sharded database servers spread across multiple data centers can be referred to as "inter-data center communications."

Sharded database load distributor component 104 can receive a request from client computer 108 and determine which data center of data centers 112 to direct the request. Sharded database load distributor component 104 can select a data center based on predicting that by assigning the request to that data center, that request can be processed with a minimum of inter-data center communications relative to assigning that request to some other data center of data centers 112.

Figure 4:
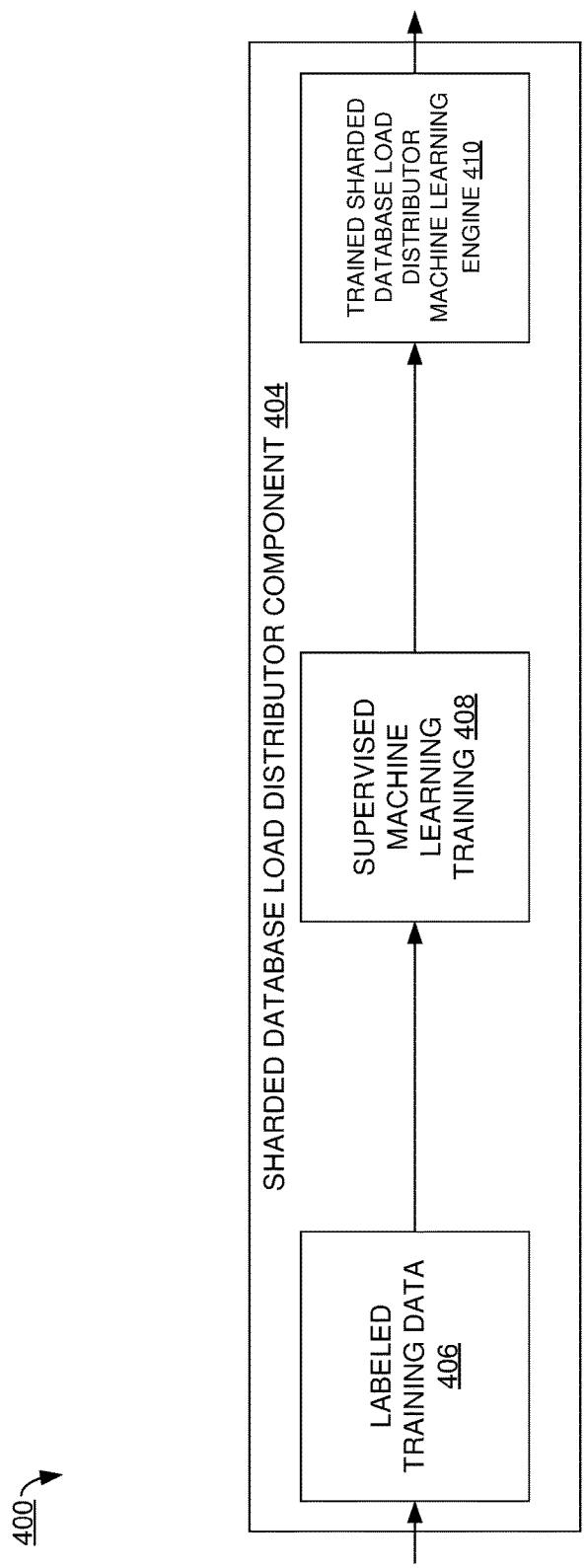
FIG. 4 illustrates an example system architecture for training a sharded database load distributor, and that can facilitate a sharded database load distributor, in accordance with an embodiment of this disclosure.

Sharded database load distributor component 104 can implement a machine learning model that is trained similar to as described with respect to system architecture 400 of FIG. 4. Sharded database load distributor component 104 can utilize a trained machine learning model to distribute load similar to as described with respect to system architecture 500 of FIG. 5.

Figure 7:
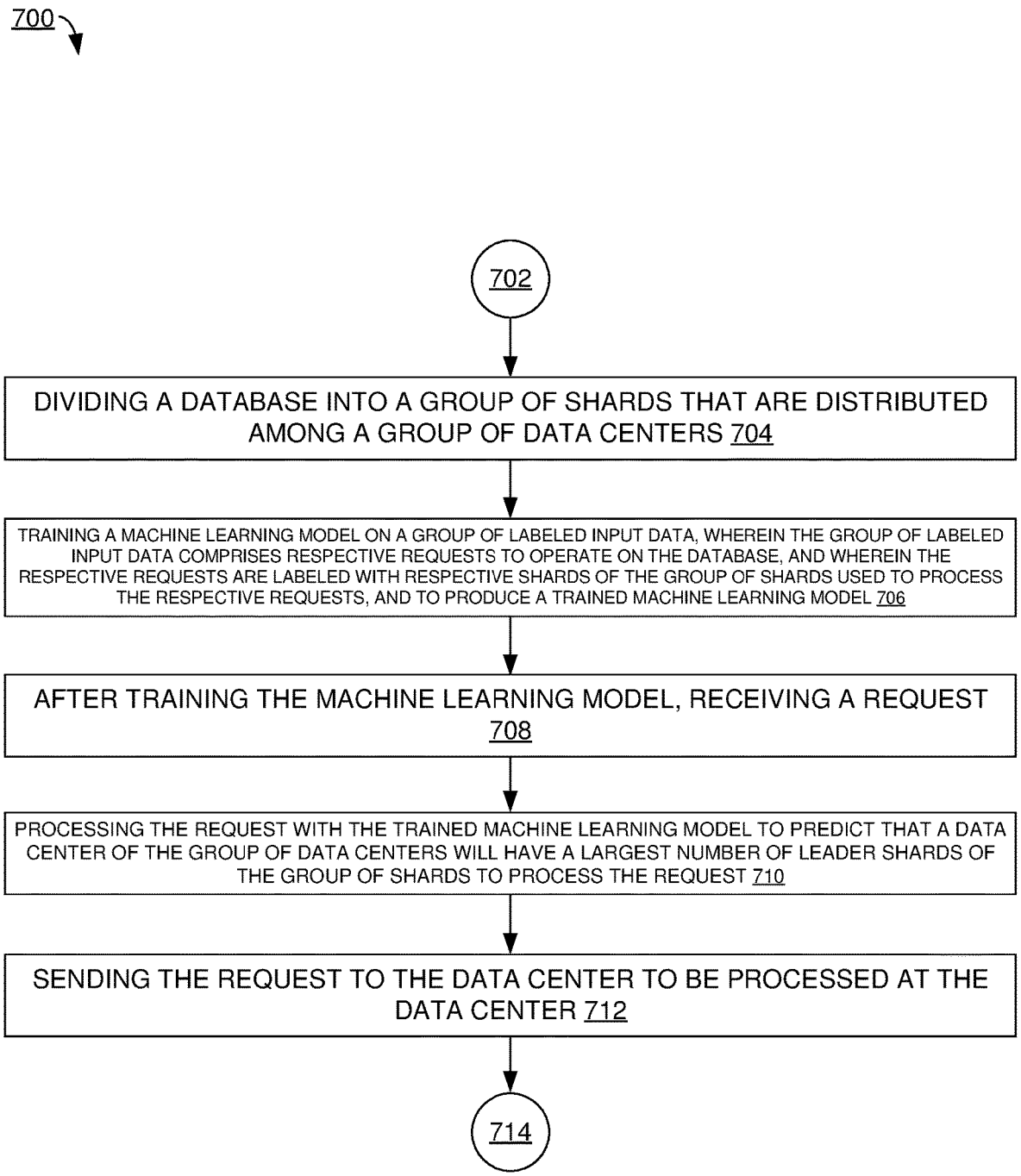
FIG. 7 illustrates an example process flow a sharded database load distributor, in accordance with an embodiment of this disclosure.

In effectuating sharded database load distribution, sharded database load distributor component 104 can implement the operating part(s) of the operating procedures of FIGS. 7-9.

Figure 2:
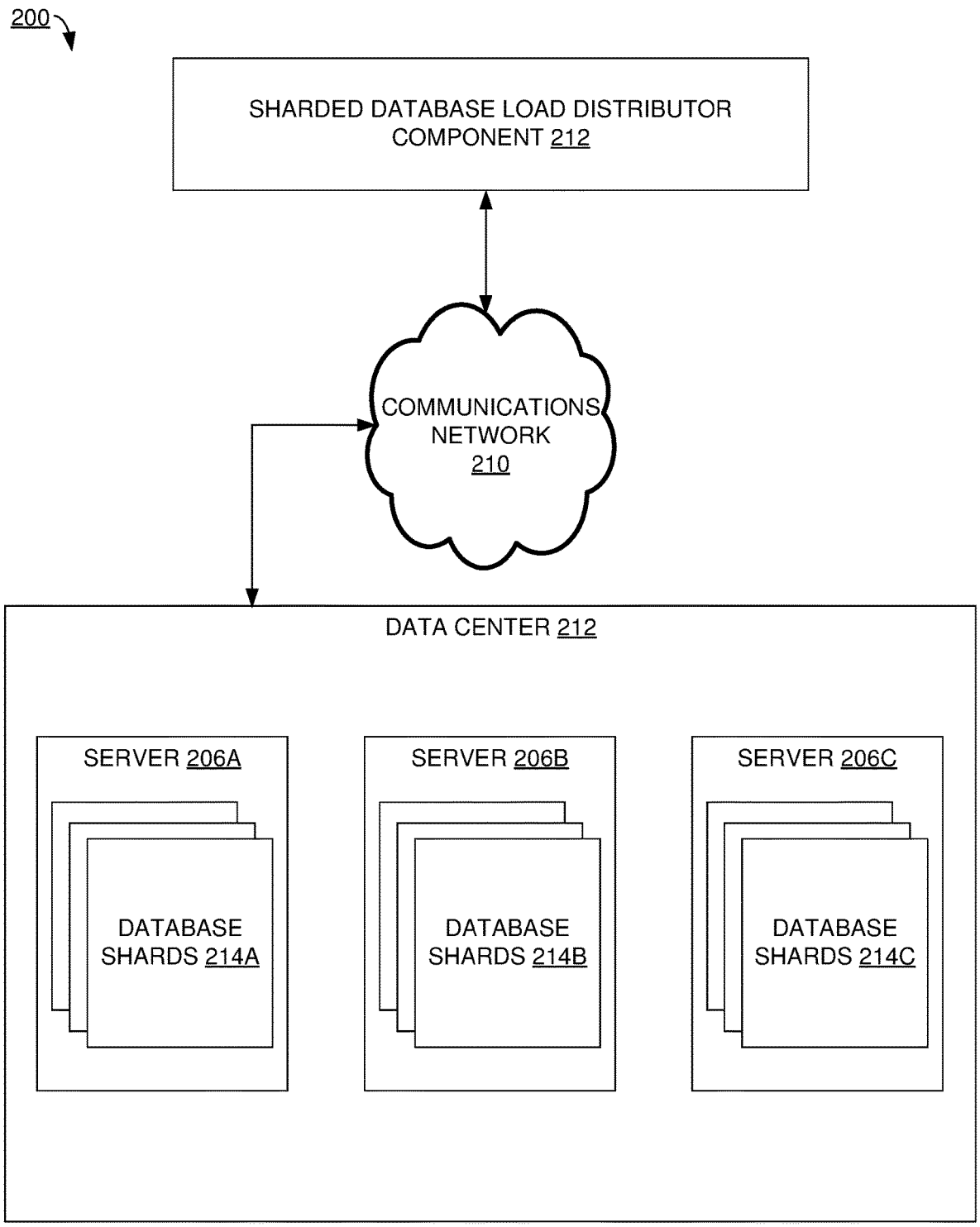
FIG. 2 illustrates another example system architecture that can facilitate a sharded database load distributor, in accordance with an embodiment of this disclosure.

FIG. 2 illustrates another example system architecture 200 that can facilitate a sharded database load distributor, in accordance with an embodiment of this disclosure.

As depicted, system architecture 200 comprises sharded database load distributor component 204 (which can be similar to sharded database load distributor component 104 of FIG. 1), communications network 210 (which can be similar to communications network 110, where communications network 110 is a public network, and communications network 210 is an intranet), and data center 212 (which can be similar to a data center of data centers 112).

Relative to system architecture 100 of FIG. 1, system architecture 200 can present a more detailed view of one data center. Data center 212 comprises multiple servers (server 206A, server 206B, and server 206C).

Each server comprises multiple shards of a sharded database. Server 206A comprises database shards 214A, server 206B comprises database shards 214B, and server 206C comprises database shards 214C.

In processing a request from a client (e.g., client computer 108 of FIG. 1), sharded database load distributor can direct the request to a data center, such as data center 212. Data center 212 can process the request with some shards stored in server 206A, server 206B, and server 206C (which could involve intra-data center communication). Where data center 212 lacks all shards needed to process the request, data center 212 can communicate with other data centers (e.g., data centers of cluster 102 of FIG. 1) (which can involve inter-data center communication).

Figure 3:
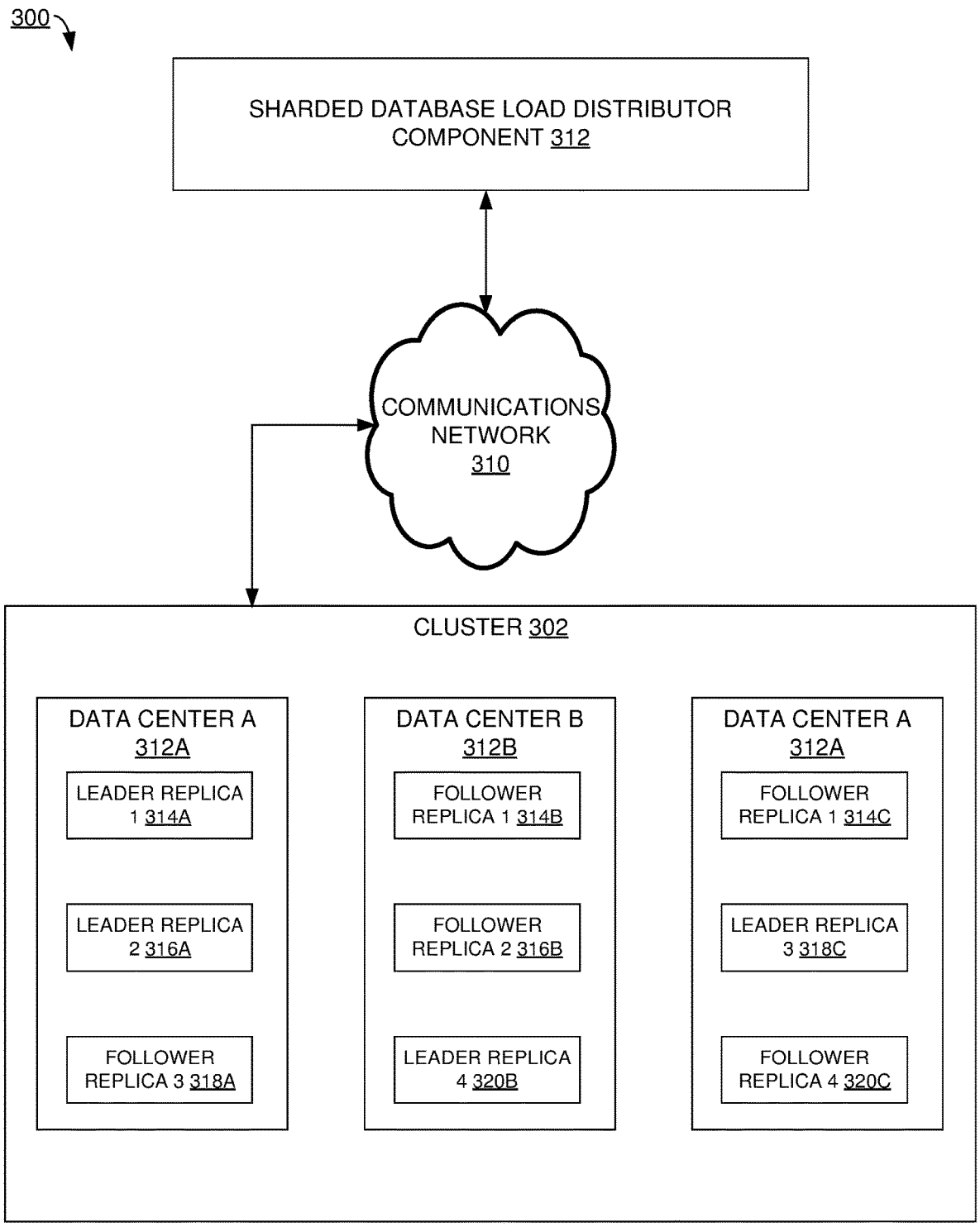
FIG. 3 illustrates another example system architecture that can facilitate a sharded database load distributor, in accordance with an embodiment of this disclosure.

FIG. 3 illustrates another example system architecture 300 that can facilitate a sharded database load distributor, in accordance with an embodiment of this disclosure.

As depicted, system architecture 300 comprises sharded database load distributor component 304 (which can be similar to sharded database load distributor component 104 of FIG. 1), communications network 310 (which can be similar to communications network 110, where communications network 110 is a public network, and communications network 310 is an intranet), and data center 312A, data center 312B, and data center 312C (which can each be similar to a data center of data centers 112).

In some examples, a group of shards that store the same information (e.g., shards that are copies of each other) can be referred to as having a leader replica and one or more follower replicas. Data center A 312A comprises leader replica 1 314A, leader replica 2 316A, and follower replica 3 318A. Data center B 312B comprises follower replica 1 314B, follower replica 2 314B, and leader replica 4 320B. Data center C 312C comprises follower replica 1 314C, leader replica 3 318C, and follower replica 4 320C.

As depicted, system architecture 300 comprises multiple shards, which each have multiple copies stored across data center A 312A, data center B 312B, and data center C 312C. That is, follower replica 1 has copies in the form of leader replica 1 314A (on data center A 312A), follower replica 1 314B (on data center B 312B), and follower replica 1 314C (on data center C 312C). Follower replica 2 has copies in the form of leader replica 2 316A (on data center A 312A), and follower replica 2 316B (on data center B 312B). Follower replica 3 has copies in the form of follower replica 3 318A (on data center A 318A), and leader replica 3 318C (on data center 3 318C). Follower replica 4 has copies in the form of leader replica 4 320B (on data center B 312B) and follower replica 4 320C (on data center 4 320C).

Sharded database load distributor component 304 can distribute requests among data center A 312A, data center B 312B, and data center C 312C based on determining which data center is likely to be able to process the request with a minimum of inter-data center communications. For example, it can be that sharded database load distributor component 304 predicts that a request will involve a write to follower replica 1, follower replica 2, and follower replica 4. In that case, sharded database load distributor component 304 can direct the request to data center A 312A. Data center A 312A can process the writes to shard 1 (via leader replica 1 314A) and shard 2 (via leader replica 2 316A) internally (so without an inter-data center communication), and then make one inter-data center communication to data center C 312C (which contains leader replica 3 318C) to write to shard 3. This one inter-data center communication can be a minimum of inter-data center communications possible to process the request given the arrangement of shards and leader replicas in cluster 302.

Note that while this is described as one inter-data center communication to interact with one leader replica in another data center, that that can involve multiple communications between the two data centers to effectuate the write.

FIG. 4 illustrates an example system architecture 400 for training a sharded database load distributor, and that can facilitate a sharded database load distributor, in accordance with an embodiment of this disclosure. System architecture 400 comprises sharded database load distributor component 404, which can be similar to sharded database load distributor component 104 of FIG. 1. In some examples, a machine learning part of sharded database load distributor component 104 (e.g., machine learning engine 508 of FIG. 5) can be trained separately from sharded database load distributor component 104, with the trained model then being supplied to sharded database load distributor component 104 for use by sharded database load distributor component 104.

Sharded database load distributor component 404 comprises labeled training data 406, supervised machine learning training 408, and trained sharded database load distributor machine learning engine 410.

Labeled training data can comprise an identifier of a session ID (e.g., "post/sites/{site_13}" as in session ID 610 of FIG. 6) and a label of what shards at what data centers were requested as part of processing that session ID (e.g., "S1 (DC1), S3 (DC2)" in requested shards 612).

Supervised machine learning training 408 can take labeled training data 406 and train a machine learning model, given an input of a session ID, produce an output of which shards at what data centers will likely be requested as part of processing that session ID. Supervised machine learning training 408 can produce a trained machine learning model—here, trained sharded database load distributor machine learning engine 410.

Trained sharded database load distributor machine learning engine 410 can then be used to distribute load among data centers of a cluster, while also minimizing inter-data center communication.

That is, trained sharded database load distributor machine learning engine 410 can predict an optimal datacenter for processing. Given a new request to a database, the shards required to process this request can be predicted as a multi-class binary classification machine learning exercise, using the request's metadata as features. Using the example aggregated log information 600 of FIG. 6, input to a machine learning model can be the session identifier, with labels being required shards. Timestamps can be utilized to weight recent requests as more important to prediction as compared to older requests (weighting can comprise increasing weights in a machine learning model that correspond to the more recent requests). The request can be sent to be processed at a datacenter that contains a highest number of predicted shards' leader replicas.

Figure 5:
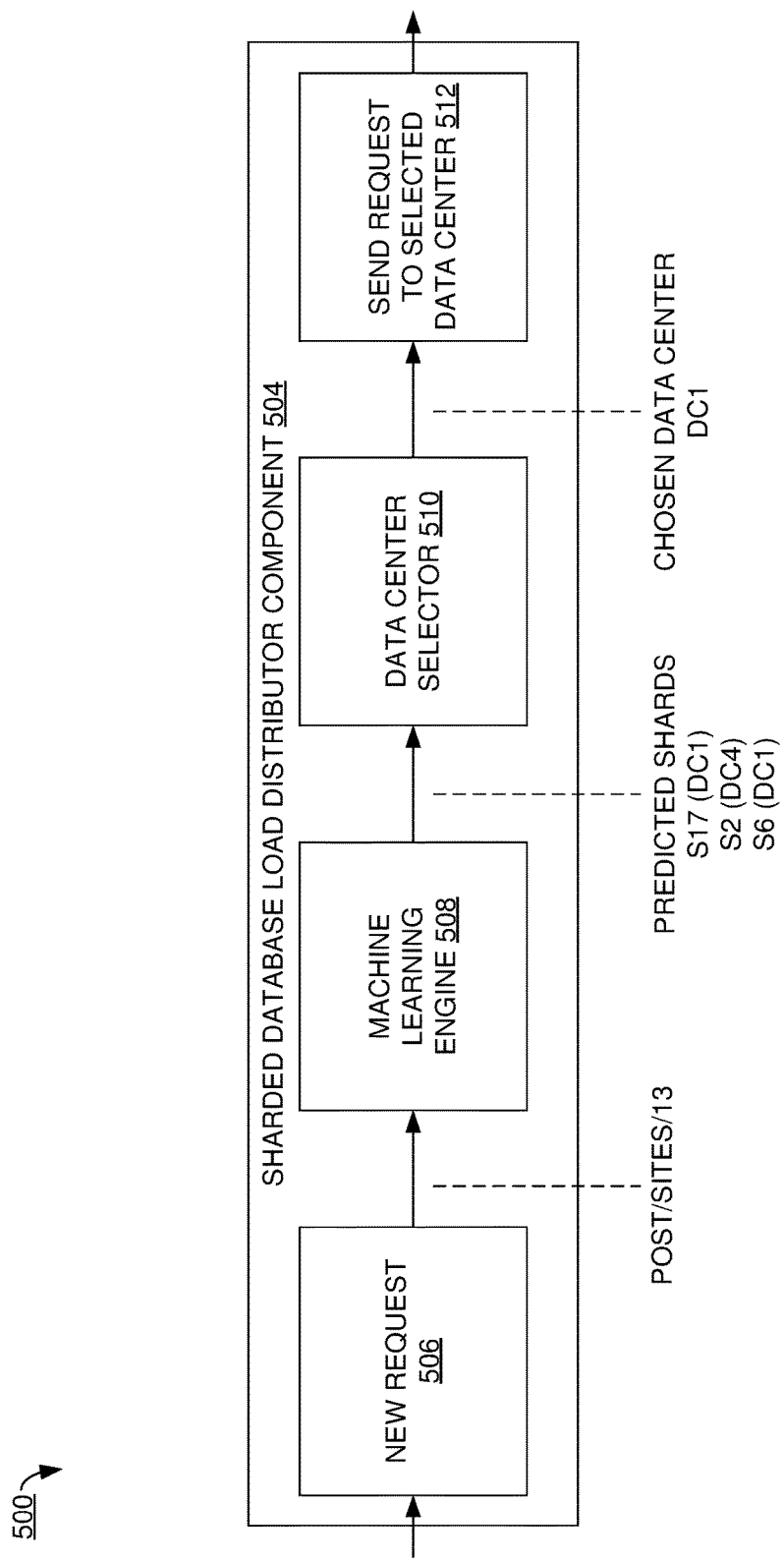
FIG. 5 illustrates an example system architecture for using a trained sharded database load distributor, and that can facilitate a sharded database load distributor, in accordance with an embodiment of this disclosure.

FIG. 5 illustrates an example system architecture 500 for using a trained sharded database load distributor, and that can facilitate a sharded database load distributor, in accordance with an embodiment of this disclosure. System architecture 500 comprises sharded database load distributor component 504, which can be similar to sharded database load distributor component 104 of FIG. 1.

Sharded database load distributor component 504 comprises new request 506, machine learning engine 508, data center selector 510, and send request to selected data center 512. New request 506 can comprise a request from client computer 108 of FIG. 1 to cluster 102 to access a database maintained by cluster 102. New request 506 can take the form of "post/sites/13," which can comprise a command to write (or post) data to a particular part (sites/13) of an object storage system.

New request 506 can be received by machine learning engine 508, which can be similar to trained sharded database load distributor machine learning engine 410 of FIG. 4. Trained sharded database load distributor machine learning engine 410 can take new request 506 as input, and output a prediction of which shards (and at which data centers) are predicted to be accessed in processing new request 506. Here, the predicted shards are S17 (DC1) (shard 17 at data center 1), S2 (DC 4), and S6 (DC1).

This output of machine learning engine 508 can be sent to data center selector 510, which can take this information and select a data center to send the request to. Here, data center selector 510 can select data center 1 for the request, since data center 1 stores two of the predicted shards (S17 and S6), and will likely involve one inter-data center communication (to data center 4 for shard 2). In contrast, sending the request to a different data center will likely require at least two inter-data center communications (one to data center 1 for shard 17, and another to data center 1 for shard 6).

Send request to selected data center 512 can comprise directing new request 506 to data center 1 for processing.

Example Log Information

Figure 6:
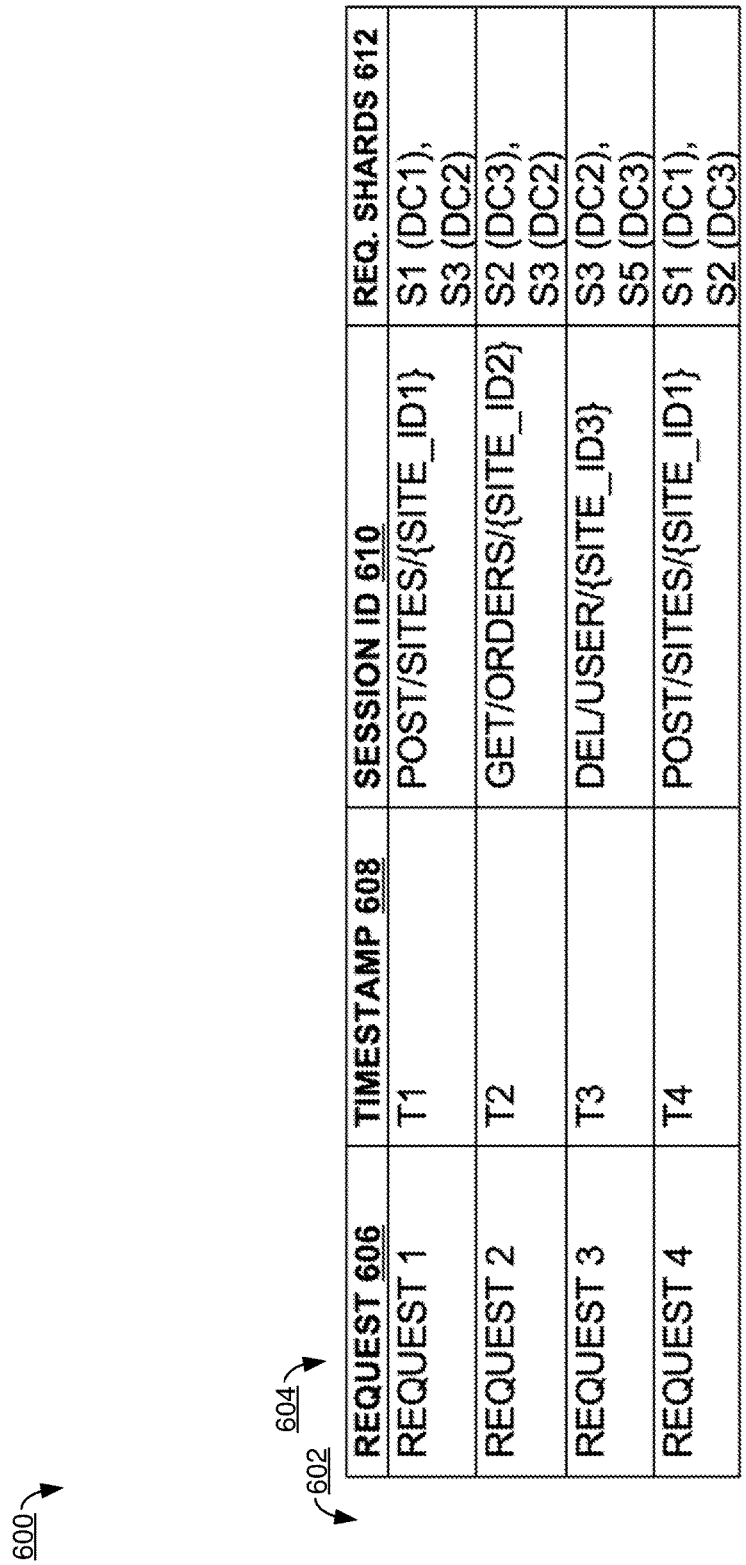
FIG. 6 illustrates an example aggregated log information that can facilitate a sharded database load distributor, in accordance with an embodiment of this disclosure.

FIG. 6 illustrates an example aggregated log information 600 that can facilitate a sharded database load distributor, in accordance with an embodiment of this disclosure. Aggregated log information 600 can be utilized by system architecture 400 as labeled training data to train a machine learning component. Aggregated log information 600 can be log information generated by cluster 102 of FIG. 1 in processing database requests from client computer 108 (and other client computers).

Aggregated log information 600 comprises rows 602 and columns 604. Each row of rows 602 identifies a different log entry. Each column of columns 604 identifies a different piece of information about that log entry. Request 606 identifies a particular request. Timestamp 608 identifies a time at which the request was made. Session ID 610 identifies the session ID associated with the request. Where processing a request involves accessing multiple shards, there can be multiple entries for one request in log information. Aggregated log information can aggregate the shard accesses for one request based on a common session ID. Requested shards 612 can indicate which shards (and at which data centers) were accessed as part of processing the request.

Regarding aggregating access information logs, given a log aggregation system, the shards that are required to process a request can be inferred. This can be implemented by filtering for logs with a the same trace ID, which can signify logs representing a single separable process. That is, a single trace ID can identify a single process that can have multiple steps (where each unique step has the same trace ID). Where multiple of these steps involve accessing shards, these shard accesses can be aggregated based on an associated trace ID.

An aggregated dataset can contain a features timestamp, session identifier, and required shards.

In this examples, the datacenters shown are to illustrate that there are different shards' leader replicas that can reside in different datacenters. In some examples, the location of shards' leader replicas can be dynamic and move among datacenters.

Example Process Flows

FIG. 7 illustrates an example process flow 700 for a sharded database load distributor, in accordance with an embodiment of this disclosure. In some examples, one or more embodiments of process flow 700 can be implemented by sharded database load distributor component 104 of FIG. 1, sharded database load distributor component 204 of FIG. 2, sharded database load distributor component 304 of FIG. 3, or computing environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 800 of FIG. 8, and/or process flow 900 of FIG. 9.

Process flow 700 begins with operation 702 and moves to operation 704. Operation 704 depicts dividing a database into a group of shards that are distributed among a group of data centers. In some examples, operation 704 can be implemented in a similar manner as depicted with respect to system architecture 300 of FIG. 3, where three data centers are depicted as each storing multiple shards.

After operation 704, process flow 700 moves to operation 706.

Operation 706 depicts training a machine learning model on a group of labeled input data, wherein the group of labeled input data comprises respective requests to operate on the database, and wherein the respective requests are labeled with respective shards of the group of shards used to process the respective requests, and to produce a trained machine learning model. In some examples, this training can be supervised machine learning training 408 of FIG. 4, the group of labeled input data can be labeled training data 405, and the trained machine learning model can be trained sharded database load distributor machine learning engine 410.

In some examples, operation 706 comprises generating the group of labeled input data, comprising filtering logs of operations on the database for operations that share a same trace identifier, wherein operations that share the same trace identifier are determined to share a single separable process. That is, the group of labeled input data can be similar to that contained within aggregated log information 600 of FIG. 6, and log information can be aggregated based on having a common session ID 610.

In some examples, operation 706 comprises assigning a higher weight to a first labeled input data of the group of labeled input data than to a second labeled input data of the group of labeled input data, wherein the first labeled input data comprises a first timestamp, wherein the second labeled input data comprises a second timestamp, and wherein the first timestamp indicates a more recent time than the second timestamp. Using the example of aggregated log information 600 of FIG. 6, data can be associated with a time stamp. In some examples, newer data is given a higher weight than older data in training a machine learning model, since the leader shards can be reassigned to different data centers over time, and the newer data can be based on a current location of leader shards in a cluster (e.g., cluster 102 of FIG. 1).

In some examples, the respective shards of the group of labeled input data comprise an indication of respective data centers of the group of data centers in which the respective shards are located. That is, the training data can identify both leader shards used to process a request as well as the respective data centers that houses those leader shards, as in requested shards 612 of FIG. 6.

After operation 706, process flow 700 moves to operation 708.

Operation 708 depicts, after training the machine learning model, receiving a request. This can be a request received from client computer 108 of FIG. 1 to access a database hosted by cluster 102, and can be received at sharded database load distributor component 104.

In some examples, the request is received from a remote computer via a communications network, and wherein the request indicates an operation to perform on the database. That is, the request can be received by sharded database load distributor component 104 of FIG. 1 and from client computer 108.

After operation 708, process flow 700 moves to operation 710.

Operation 710 depicts processing the request with the trained machine learning model to predict that a data center of the group of data centers will have a largest number of leader shards of the group of shards to process the request. This can be similar to machine learning engine 508 of FIG. 1 and data center selector 510 processing new request 506 to select a data center (e.g., a data center of data centers 112 of FIG. 1).

In some examples, operation 710 can comprise identifying a data center that is predicted to have at least a threshold number of leader shards (or at least a minimum percentage of leader shards relative to the data center that has the most leader shards).

In some examples, the trained machine learning model produces an output from processing the request, wherein the output comprises a prediction of shards and corresponding data centers that will be accessed as part of responding to the request, and wherein a data center selection component selects the data center based on the output from the trained machine learning model. That is, an architecture similar to machine learning engine 508 of FIG. 5 and data center selector 510 can be implemented.

After operation 710, process flow 700 moves to operation 712.

Operation 712 depicts sending the request to the data center to be processed at the data center. This can be performed similar to as described with respect to send request to selected data center 512 of FIG. 5.

In some examples, operation 712 comprises sending the request to the data center to be processed at the data center in response to determining that the data center will have the largest number of leader shards of the group of shards to process the request. That is, a request can be sent to the data center because the data center is predicted to have the most shards that will be used in processing the request.

In some examples, operation 712 comprises sending the request to the data center based on predicting that the data center is able to process the request with a lowest number of inter-data center communications of among the group of data centers. That is, a data center can be selected based on predicting that it has the most shards used to process a request because that is likely to minimize inter-data center communications. In some examples, operation 712 can comprise sending the request to a data center that is predicted to be able to process the request with a number of inter-center data communications that is below a predetermined threshold number (such as a percentage of the minimum predicted inter-data center communications for a data center of the group of data centers).

After operation 712, process flow 700 moves to 714, where process flow 700 ends.

FIG. 8 illustrates another example process flow 800 for a sharded database load distributor, in accordance with an embodiment of this disclosure. In some examples, one or more embodiments of process flow 800 can be implemented by sharded database load distributor component 104 of FIG. 1, sharded database load distributor component 204 of FIG. 2, sharded database load distributor component 304 of FIG. 3, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 700 of FIG. 7, and/or process flow 900 of FIG. 9.

Process flow 800 begins with operation 802 and moves to operation 804. Operation 804 depicts training, by a system comprising a processor, a machine learning model based on a group of input data, the group of input data comprising respective requests to operate on a data store that are labeled with respective shards of a group of shards that are distributed among a group of data centers, wherein the respective shards are used to process the respective requests, and to produce a trained machine learning model. In some examples, operation 804 can be implemented in a similar manner as operation 706 of FIG. 7.

In some examples, the group of input data comprises respective session identifiers. In some examples, the group of input data comprises a timestamp. That is, the group of input data can be similar to that found in aggregated log information 600 of FIG. 6.

In some examples, operation 804 comprises assigning a higher weight to a first labeled input data of the group of input data than to a second labeled input data of the group of input data, wherein the first labeled input data comprises a first timestamp, wherein the second labeled input data comprises a second timestamp, and wherein the first timestamp indicates a more recent time than the second timestamp. Operation 804 can be implemented in a similar manner as operation 706 of FIG. 7 as applied to assigning weights to input data.

In some examples, operation 804 comprises generating the group of input data, comprising filtering logs of operations on the data store for operations that share a same trace identifier, wherein operations that share the same trace identifier are determined to share a single separable process. Operation 804 can be implemented in a similar manner as operation 706 of FIG. 7 as applied to generating the group of input data.

In some examples, the group of shards comprises respective horizontally-divided portions of the data store.

After operation 804, process flow 800 moves to operation 806.

Operation 806 depicts processing a request with the trained machine learning model to predict that a data center of the group of data centers is threshold likely to have a largest number of shards of the group of shards to process the request. In some examples, operation 806 can be implemented in a similar manner as operation 710 of FIG. 7.

After operation 806, process flow 800 moves to operation 808.

Operation 808 depicts sending the request to first data center. In some examples, operation 808 can be implemented in a similar manner as operation 721 of FIG. 7.

In some examples, a first latency associated with performing an operation on two shards within the same data center of the group of data centers is lower than a second latency associated with performing the operation on two shards stored in different data centers of the group of data centers. That is, a reason for minimizing inter-data center communication is that an operation performed within a data center can be performed faster than performing that operation where that operation involves an inter-data center communication.

After operation 808, process flow 800 moves to 810, where process flow 800 ends.

FIG. 9 illustrates another example process flow 900 for facilitating a sharded database load distributor, in accordance with an embodiment of this disclosure. In some examples, one or more embodiments of process flow 900 can be implemented by sharded database load distributor component 104 of FIG. 1, sharded database load distributor component 204 of FIG. 2, sharded database load distributor component 304 of FIG. 3, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 700 of FIG. 7, and/or process flow 800 of FIG. 8.

Process flow 900 begins with operation 902 and moves to operation 904. Operation 904 depicts dividing a data store into a group of shards that are distributed among a group of data centers. In some examples, operation 904 can be implemented in a similar manner as operation 704 of FIG. 7.

After operation 904, process flow 900 moves to operation 906.

Operation 906 depicts training a machine learning model on a group of input data, wherein the group of input data comprises respective requests to operate on the data store that are labeled with respective shards of the group of shards used to process the respective requests, and to produce a trained machine learning model. In some examples, operation 906 can be implemented in a similar manner as operation 706 of FIG. 7.

In some examples, operation 906 comprises generating the group of input data, comprising filtering logs of operations on the data store for operations that share a same trace identifier, wherein operations that share the same trace identifier are determined to share a single separable process. Operation 906 can be implemented in a similar manner as operation 706 of FIG. 7 as applied to generating the group of input data.

In some examples, operation 906 comprises assigning a higher weight to a first labeled input data of the group of input data than to a second labeled input data of the group of input data, wherein the first labeled input data comprises a first timestamp, wherein the second labeled input data comprises a second timestamp, and wherein the first timestamp indicates a more recent time than the second timestamp. Operation 906 can be implemented in a similar manner as operation 706 of FIG. 7 as applied to assigning weights to input data.

In some examples, the respective requests to operate on the data store comprise respective representational state transfer application programming interface calls that are received from a remote computer and via a communications network. That is, the respective requests can comprise representational state transfer (REST) application programming interface (API) calls in a client-server architecture, where, e.g., client computer 108 of FIG. 1 can serve as the client and cluster 102 can serve as the server. In some examples, other types of API calls can be made to operate on the data store.

After operation 906, process flow 900 moves to operation 908.

Operation 908 depicts storing the trained machine learning model. In some examples, this can comprise storing the trained machine learning model as part of sharded database load distributor component 104 of FIG. 1 so that sharded database load distributor component 104 can utilize the trained model in determining how to distribute requests among data centers 112.

In some examples, operation 908 comprises processing a request with the trained machine learning model to predict that a data center of the group of data centers will have a largest number of shards of the group of shards to process the request, and sending the request to the data center. That is, in some examples operation 908 can be implemented in a similar manner as operations 710-712 of FIG. 7.

After operation 908, process flow 900 moves to 910, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of cluster 102, sharded database load distributor component 104, sharded database servers 106, client computer 108, and/or data centers 112 of FIG. 1

In some examples, computing environment 1000 can implement one or more embodiments of the process flows of FIGS. 7-9 to facilitate a sharded database load distributor.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, stand-alone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples, and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    at least one processor; and
    at least one memory that stores executable instructions that, when executed by the processor, facilitate performance of operations, comprising:
        dividing a database into a group of shards that are distributed among a group of data centers;
        training a machine learning model on a group of labeled input data, wherein the group of labeled input data comprises respective requests to operate on the database, and wherein the respective requests are labeled with respective shards of the group of shards used to process the respective requests, and to produce a trained machine learning model;
        after training the machine learning model, receiving a request;
        processing the request with the trained machine learning model to predict that a data center of the group of data centers will have a largest number of leader shards of the group of shards to process the request; and
        sending the request to the data center to be processed at the data center.

2. The system of claim 1, wherein the operations further comprise:
    generating the group of labeled input data, comprising filtering logs of operations on the database for operations that share a same trace identifier, wherein operations that share the same trace identifier are determined to share a single separable process.

3. The system of claim 1, wherein training the machine learning model comprises:
    assigning a higher weight to a first labeled input data of the group of labeled input data than to a second labeled input data of the group of labeled input data, wherein the first labeled input data comprises a first timestamp, wherein the second labeled input data comprises a second timestamp, and wherein the first timestamp indicates a more recent time than the second timestamp.

4. The system of claim 1, wherein the respective shards of the group of labeled input data comprise an indication of respective data centers of the group of data centers in which the respective shards are located.

5. The system of claim 1, wherein the trained machine learning model produces an output from processing the request, wherein the output comprises a prediction of shards and corresponding data centers that will be accessed as part of responding to the request, and wherein a data center selection component selects the data center based on the output from the trained machine learning model.

6. The system of claim 1, wherein the operations further comprise:
sending the request to the data center based on predicting that the first data center is able to process the request with a lowest number of inter-data center communications of among the group of data centers.

7. The system of claim 1, wherein the operations further comprise:
sending the request to the data center to be processed at the data center in response to determining that the data center will have the largest number of leader shards of the group of shards to process the request.

8. The system of claim 1, wherein the request is received from a remote computer via a communications network, and wherein the request indicates an operation to perform on the database.

9. A method, comprising:
training, by a system comprising at least one processor, a machine learning model based on a group of input data, the group of input data comprising respective requests to operate on a data store that are labeled with respective shards of a group of shards that are distributed among a group of data centers, wherein the respective shards are used to process the respective requests, and to produce a trained machine learning model;
processing, by the system, a request with the trained machine learning model to predict that a data center of the group of data centers is threshold likely to have a largest number of shards of the group of shards to process the request; and
sending, by the system, the request to the data center.

10. The method of claim 9, wherein a first latency associated with performing an operation on two shards within the same data center of the group of data centers is lower than a second latency associated with performing the operation on two shards stored in different data centers of the group of data centers.

11. The method of claim 10, wherein the group of input data comprises respective session identifiers.

12. The method of claim 10, wherein the group of input data comprises a timestamp.

13. The method of claim 12, wherein training the machine learning model comprises:
assigning, by the system, a higher weight to a first labeled input data of the group of input data than to a second labeled input data of the group of input data, wherein the first labeled input data comprises a first timestamp, wherein the second labeled input data comprises a second timestamp, and wherein the first timestamp indicates a more recent time than the second timestamp.

14. The method of claim 9, wherein the group of shards comprises respective horizontally-divided portions of the data store.

15. The method of claim 9, further comprising:
generating, by the system, the group of input data, comprising filtering logs of operations on the data store for operations that share a same trace identifier, wherein operations that share the same trace identifier are determined to share a single separable process.

16. A non-transitory computer-readable medium comprising instructions that, in response to execution, cause a system comprising at least one processor to perform operations, comprising:
dividing a data store into a group of shards that are distributed among a group of data centers;
training a machine learning model on a group of input data, wherein the group of input data comprises respective requests to operate on the data store that are labeled with respective shards of the group of shards used to process the respective requests, and to produce a trained machine learning model;
processing a request with the trained machine learning model to predict that a data center of the group of data centers will have a largest number of shards of the group of shards to process the request; and
sending the request to the data center.

17. The non-transitory computer-readable medium of claim 16, wherein the operations further comprise:
generating the group of input data, comprising filtering logs of operations on the data store for operations that share a same trace identifier, wherein operations that share the same trace identifier are determined to share a single separable process.

18. The non-transitory computer-readable medium of claim 16, wherein training the machine learning model comprises:
assigning a higher weight to a first labeled input data of the group of input data than to a second labeled input data of the group of input data, wherein the first labeled input data comprises a first timestamp, wherein the second labeled input data comprises a second timestamp, and wherein the first timestamp indicates a more recent time than the second timestamp.

19. The non-transitory computer-readable medium of claim 16, wherein the respective requests to operate on the data store comprise respective representational state transfer application programming interface calls, or application programming interface calls according to another format, that are received from a remote computer and via a communications network.

20. The non-transitory computer-readable medium of claim 16, wherein the operations further comprise:
generating the group of input data, comprising filtering logs of operations on the database for operations that share a same trace identifier, wherein operations that share the same trace identifier are determined to share a single separable process.

* * * * *